Patented July 16, 1946

2,403,972

UNITED STATES PATENT OFFICE 2,403,972

PROCESS FOR EXTRACTING AN AROMATIC HYDROCARBON FROM A MIXTURE CONTAINING OTHER HYDROCARBONS

Bernard S. Friedman, Riverside, Ill., assignor to Universal Oil Products Company, Chicago, Ill., a corporation of Delaware No Drawing. Application May 20, 1943, Serial No. 487,806

15 Claims. (Cl. 260—674)

This invention relates to a process for the separation of hydrocarbons, and particularly aromatic hydrocarbons, and to a novel separating agent therefor.

In a broad aspect the present invention comprises the treatment of a hydrocarbon mixture with a separating agent comprising a silver salt dissolved in sulfuric acid or a mixture of sulfuric and sulfonic acids.

In a specific embodiment the present invention comprises the separation of aromatic hydrocarbons from other constituents of a hydrocarbon mixture by treatment with silver sulfate dissolved in sulfuric acid under conditions to form an extract phase and a raffinate phase.

In another specific embodiment the present invention comprises the separation of aromatic hydrocarbons from other constituents of a hydrocarbon mixture by treatment with silver sulfate dissolved in a mixture of sulfuric and sulfonic acids under conditions to form an extract phase and a raffinate phase.

The present invention is directed primarily to the separation of aromatic hydrocarbons from a hydrocarbon mixture containing the same and other constituents by means of the preferential solubility of the aromatic hydrocarbons in the separating agent of the present invention. Thus the present invention may be utilized for the separation of aromatic hydrocarbons from a mixture containing the same and paraffinic and/or naphthenic hydrocarbons. Likewise, the invention may be employed, for example, for the purification of a substantially saturated hydrocarbon fraction such as straight run gasolines which usually contains a small proportion of aromatic hydrocarbons, the aromatic hydrocarbons being removed from hydrocarbon fractions by means of the present invention, to leave a substantially saturated hydrocarbon fraction which will contain substantially no aromatic hydrocarbons or at least less aromatic hydrocarbons than were present in the original hydrocarbon fraction. It is preferred that the hydrocarbon fraction treated in accordance with the present invention contains substantially no olefinic hydrocarbons or that if there are olefins in the mixture, they should constitute less than say about 10% and preferably less than 5% of the mixture.

In certain cases the present invention may be utilized for the treatment of a hydrocarbon fraction containing only aromatic hydrocarbons, these being of different types. For example, a hydrocarbon fraction containing mono-cyclic and poly-cyclic aromatic hydrocarbons may be treated in accordance with the present invention to separate the mono-cyclic from the poly-cyclic aromatic hydrocarbons.

The present invention is characterized by the novel separating agent, which broadly comprises a solution of a silver salt in sulfuric acid or a mixture of sulfuric and sulfonic acids and particularly a solution of silver sulfate in sulfuric acid or a mixture of sulfuric and aromatic sulfonic acids. I have discovered that the separating agent of the present invention is especially effective in accomplishing the separation of aromatic hydrocarbons. The separating agent herein disclosed has a high capacity; that is, it will dissolve large proportions of the desired compounds; and, in addition, it has a high selectivity; that is, it will dissolve the aromatic hydrocarbons preferentially to the non-aromatic hydrocarbons.

The separating agent of the present invention preferably comprises silver sulfate dissolved in sulfuric acid or a mixture of sulfuric and sulfonic acids. Any suitable salt of silver may be used, e. g., silver sulfate and carbonate, but not necessarily with the equivalent results. The oxide of silver may also be employed in some instances.

My experiments have indicated that best results are obtained when employing a high concentration of the silver salt. However, the concentration of the silver salt which may be utilized in the separating agent is limited by the concentration of the sulfuric acid. The concentration of sulfuric acid usually will range from 65% to 100% or even more but preferably is from 75% to 100%.

The separating agent of the present invention may readily be prepared by adding a suitable silver salt to sulfuric acid of the desired concentration in order to obtain a final mixture having the required composition. In general, the concentration of the acid should be between about 75 to about 96% or more and the amount of silver salt added may range from about 1 part by weight to a saturated or even supersaturated solution. A suitable separating agent, for example, has been prepared by admixing 10 parts by weight of silver sulfate with 90 parts by weight of 96% sulfuric acid.

A separating agent which has been prepared as heretofore described will, when contacted with a hydrocarbon mixture containing aromatic hydrocarbons, react with the aromatic hydrocarbons to form aromatic sulfonic acids. I have found that the silver salt dissolved in a mixture of sulfuric and sulfonic acids is an effective separating agent for aromatic hydrocarbons, As will hereinafter be described in detail, the sulfonic acid enhances the solubility of silver sulfate in the acid and thus permits dissolving a greater amount of silver salt on the separating agent. Therefore, it is desired to use a comparatively high concentration of sulfuric acid not only because it dissolves large quantities of the silver salt, but also because the more highly concentrated sulfuric acid will react with the aromatic hydrocarbons to produce more aromatic sulfonic acids.

It is a particular feature of the present invention that the separating agent may be prepared by admixing the silver salt with sulfuric acid and subsequently, either as a separate step or during the initial period of the separating process, reacting the mixture of silver salt and sulfuric acid with aromatic hydrocarbons in order to produce the sulfonic acid. In commercial operations it probably will be preferred to prepare the desired mixture of silver salt and sulfuric acid and then contact the mixture with the hydrocarbon fraction which it is desired to treat in the process, thus forming the sulfonic during the initial period of the separating process.

As another feature of the present invention, it has been found that the sulfonic acid increases the solubility of the silver salt in the acid. For example, a separating agent comprising 100 parts by weight of sulfuric acid of 65% concentration dissolved only 2 parts by weight of silver sulfate to form a saturated solution. On the other hand, 100 parts by weight of sulfuric acid of 65% concentration admixed with 186 parts by weight of benzene sulfonic acid dissolved 25 parts by weight of silver sulfate. However, it has been found that, even though such a mixture of silver salt, sulfuric acid, sulfonic acid, and water, has been prepared, the mixture may still react to sulfonate additional aromatic hydrocarbons until the point is reached where the mixture is completely stabilized. The term "stabilize" as used herein is intended to mean that the mixture of silver salt, sulfuric acid, sulfonic acid and water will not effect further substantial sulfonation of aromatic hydrocarbons. Thus, in one specific embodiment of the invention once the composition of the truly stabilized solution has been determined, it may conveniently be prepared by mixing the proper proportions of silver salt, sulfuric acid, sulfonic acid and water.

The preferred sulfonic acid comprises an aromatic sulfonic acid, although it is understood that other sulfonic acids, such as aliphatic or naphthenic sulfonic acids may be employed but not necessarily with equivalent results. Likewise, it is understood that the sulfonic acids may also contain other substituent groups such as hydroxyl, nitro, carboxyl, alkoxy, etc. but here again not necessarily with equivalent results.

In general it is preferred that the aromatic hydrocarbons used in preparing the sulfonic acid be of the same type as the aromatic hydrocarbon which is to be separated in the process. Thus, for example, if benzene is the aromatic which it is desired to separate from a mixture thereof with other hydrocarbons, the sulfonic acid is preferably benzene sulfonic acid. However, the sulfonic acid of certain aromatic hydrocarbons are too insoluble in a mixture of silver sulfate and sulfuric acid, with the result that there is produced a solid mass which is not desirable for use as a separating agent. For example, with the sulfonic acid of toluene, mesitylene, amyl-naphthalene and diamyl-naphthalene under atmospheric conditions, the silver sulfate-sulfuric acid mixtures solidify and thus are unsatisfactory for use at atmospheric conditions.

In certain cases the separating agent may comprise a mixture of a silver salt dissolved in a sulfonic acid without any appreciable amounts of sulfuric acid being present. However, in certain tests which I have conducted I have found that silver sulfate is only slightly soluble in benzene sulfonic acid and, therefore, in general such a mixture is not preferred. It is understood nevertheless that there may be operations in which such a dilute solution is satisfactory and thus solutions of silver salt in sulfonic acid are included within the broad scope of the present invention but not on an equivalent basis with the mixtures containing sulfuric acid.

The temperature employed in the separation process will depend upon the particular compounds being treated and upon the particular separating agent being employed and may range from subatmospheric up to 150° F., or more, and preferably of from about 50 to about 100° F. Although atmospheric, subatmospheric or superatmospheric pressures may be employed, it is generally preferred to employ sufficient superatmospheric pressure in order to maintain the hydrocarbons in substantially liquid phase.

Any suitable type of apparatus may be employed for effecting the desired separation, and this may take the form of a single or multiple stage operation. Batch operations may be effected by contacting the hydrocarbon mixture and the separating agent in a vessel which is maintained at the proper temperature and pressure conditions and which preferably is provided with some sort of stirring mechanism. After satisfactory mixing has been accomplished, the mixture may be allowed to settle into an extract phase and a raffinate phase and each of these phases may then be separately withdrawn.

Continuous operations are well-known in the art at the present time and may take the form of one or more vessels or zones which do or do not contain packing material such as clays, gravel, synthetic materials, etc. and/or fractionating means such as baffle plates, bubble trays and the like. Either concurrent or countercurrent flow may be employed and the mixture may then be allowed to settle in either the same or different zones in order to separate an extract layer and a raffinate layer. These layers are then separately withdrawn.

After separation of these layers the hydrocarbons may be recovered from the separating agent by any suitable means. The preferred method of recovering the hydrocarbon from the separating agent is to use a secondary solvent which is immiscible with the separating agent and which is lower or higher boiling than the aromatic hydrocarbon. The secondary solvent preferably comprises a hydrocarbon and particularly a paraffinic hydrocarbon such as propane, butane, pentane, cetane, etc.

Another suitable method of recovering the hydrocarbon from the separating agent is by reducing the pressure of the extract phase. This method may have particular application when the absorption step of the process is conducted under high pressure. Another method which may be employed is by heating the extract phase to a higher temperature in order to distill the hydrocarbons. However, this method must be used with caution since the higher temperatures will result in additional sulfonation of the aromatic hydrocarbons although in some cases, it may even be preferred to utilize the higher temperatures in order to sulfonate the aromatic hydrocarbons to the full extent of the separating agent and thereby avoid any further sulfonation in the further use of the separating agent within the process. In still some other instances it may be advantageous to employ both an increased temperature and a reduced pressure in the desorption or recovery stage.

The addition of water to the extract phase will effect the separation of the hydrocarbons and the separating agent. However, in some cases it probably will be necessary to subject the separating agent to distillation, preferably under vacuum, to recover the final traces of hydrocarbons therefrom.

It is also within the scope of the invention to recover the hydrocarbons from the separating agent by multiple stage desorption conducted at increasing temperature and/or decreasing pressure. In this manner, the first portion so desorbed or released will be richer in one type of compound than will be the subsequently desorbed portions.

It is understood, however, that the recited methods of recovering the hydrocarbons from the separating agent will not necessarily be equivalent in their effectiveness and that the choice as to the particular method to be used will depend primarily upon the type of hydrocarbons undergoing treatment.

After separation of the hydrocarbons, the separating agent may be removed from the process but preferably is recycled to the extraction zone for further use therein. When desired, the separating agent may be utilized for the separation of other hydrocarbon mixtures in the same or different zones.

The invention will be further illustrated in the following specific examples of several operations of the process.

Example I

A saturated solution of silver sulfate in sulfuric acid of 85% concentration was prepared which contained 3.6% of silver by weight. This separating agent dissolved 12.5 cc. of benzene per 100 cc. of solvent. The cc. of benzene dissolved per mol of silver is 211. The mols of benzene dissolved per mol of silver amount to 2.37.

By comparison, a 70% aqueous solution of silver nitrate which contained 44.5% by weight of silver dissolved only 3.3 cc. of benzene per 100 cc. of solution. On the basis of mol of benzene dissolved per mol of silver, the separating agent containing silver sulfate is 60 times more effective than the silver nitrate solution.

Example II

A mixture comprising 50% by volume of benzene and 50% by volume of normal heptane was treated with an equal volume of separating agent comprising sulfuric acid of 85% concentration containing about 2.7% of silver. This separating agent dissolved 10 cc. of benzene per 100 cc. of separating agent. However, this particular separating agent was only ¾ saturated with silver sulfate and therefore is not as effective as it would be if it were completely saturated.

The dissolved benzene was recovered from the separating agent by diluting the mixture with water. It was found by index of refraction determination that the recovered benzene was of 97 to 99% purity.

Example III

A silver sulfate sulfuric acid separating agent containing 7.4% by volume of dissolved benzene was treated with a secondary solvent to give the following results:

| Secondary solvent | Per cent by volume of available benzene extracted by the secondary solvent. |
|---|---|
| Normal pentane | 66–69 |
| Normal heptane | 61 |
| Normal hexadecane | 50 |
| Methylcyclohexane | 58 |

Example IV

Various silver sulfate sulfuric acid separating agents containing different concentrations of dissolved benzene were prepared in order to determine the amount of hydrocarbon which may be recovered therefrom. The secondary solvent employed in these tests was normal pentane and the results obtained are as follows:

| Per cent by volume of benzene in the separating agent | Per cent by volume of benzene extracted by normal pentane |
|---|---|
| 7.40 | 66 |
| 3.70 | 62 |
| 1.36 | 67 |

It is thus seen that the percentage of benzene extracted by normal pentane does not vary considerably with the concentration of benzene in the separating agent.

Example V

A practically saturated solution of silver sulfate in sulfuric acid of 90% concentration, which solution contained 7.9% by weight of silver sulfate, dissolved 24 ml. of benzene per 100 ml. of separating agent. Water in the form of ice and hydrogen chloride were added to the separating agent containing the dissolved benzene in order to recover the benzene. By this means 10 ml. of benzene were recovered, which amounted to 1.35 mols of benzene recovered per mol of silver. However, 14 ml. of benzene underwent sulfonation and were not recovered.

Example VI

Another practically saturated solution of silver sulfate in sulfuric acid of 96% concentration, which solution contained 15% by weight of silver sulfate, dissolved 66 ml. of benzene per 100 ml. of separating agent. Water in the form of ice and hydrogen chloride were added to the separating agent as before in order to recover the benzene. By this means 43 ml. of benzene were recovered, which amounted to 2.49 mols of benzene recovered per mol of silver. However, 21 ml. of benzene underwent sulfonation and were not recovered. On the basis of the higher solvent capacity and the more effective mols of benzene recovered per mol of silver, the separating agent comprising 15% by weight of silver sulfate in sulfuric acid of 96% concentration is one of the preferred solvents of the present invention.

Example VII

A separating agent comprising 7.9% by weight of silver sulfate in sulfuric acid of 90% concentration dissolved 42 ml. of cumene per 100 ml. of separating agent. Upon the addition of ice and hydrogen chloride, 24 ml. of cumene were recovered, which amounted to 2.05 mols cumene recovered per mol of silver. 18 mls. of cumene underwent sulfonation.

Example VIII

A separating agent comprising 15% by weight of silver sulfate in sulfuric acid of 96% concentration dissolved 116 ml. of cumene per 100 ml. of separating agent. Upon the addition of ice and hydrogen chloride, 63 ml. of cumene were recovered, which amounted to 2.32 mols cumene recovered per mol of silver. 53 mls. of cumene were sulfonated.

Example IX

Sulfuric acid of 96% concentration was reacted with various aromatic hydrocarbons for 16 hours at a temperature of 122° F. in the presence of 1% of silver sulfate in order to sulfonate the aromatic hydrocarbons and thereby stabilize the separating agent. The sulfuric acid-sulfonic acid layer was then separated from the undissolved aromatic hydrocarbon and was enriched with 9.1% of silver sulfate. This solution was tested for its solvent power for benzene, toluene and cumene, and gave the following results:

| Aromatic hydrocarbon used to stabilize the separating agent | Aromatic hydrocarbon dissolved | Ml. per 100 ml. of solvent | | | Mols of aromatic hydrocarbon recovered per mol of silver |
|---|---|---|---|---|---|
| | | Dissolved | Recovered | Sulfonated | |
| Benzene | Benzene | 25 | 19 | 6 | 2.28 |
| Do | Toluene | 27 | 22 | 5 | 2.16 |
| Do | Cumene | 28 | 23 | 5 | 2.01 |
| Cumene | Toluene | 63 | 54 | 9 | 6.03 |
| Do | Cumene | 42 | 41 | 1 | 3.77 |

It is to be noted that the sulfonic acid of cumene also exerts a solvent power of its own since the separating agent comprising silver sulfate, sulfuric acid, cumene sulfonic acid, and water, dissolved higher portions of aromatic hydrocarbons than did the benzene sulfonic acid mixture.

Example X

The stabilized agents containing benzene sulfonic and cumene sulfonic acid of Example IX were utilized to separate benzene from a mixture containing equal amounts of benzene and heptane with the following results:

| Aromatic hydrocarbon used to stabilize the separating agent | Benzene | | |
|---|---|---|---|
| | Ml. per 100 ml. of solvent | | |
| | Dissolved | Recovered | Sulfonated |
| Benzene | 17 | 16 | 1 |
| Cumene | 14 | 6 | 8 |

Example XI

The following table shows the results obtained in dissolving various aromatic hydrocarbons in a separating agent which had been prepared by dissolving 10 parts by weight of silver sulfate in 90 parts by weight of sulfuric acid of 96% concentration and then stabilizing with benzene at a temperature of 158 to 176° F. followed by exhaustive extraction of the dissolved unsulfonated benzene with normal pentane. Comparable solubilities were also determined with similar separating agents except that the aromatic sulfonic acid comprised the sulfonic acid of the same type of aromatic hydrocarbon as that being dissolved in the separating agent.

| Aromatic | Ml. of aromatics dissolved per 100 ml. of separating agent | |
|---|---|---|
| | Separating agent containing benzene sulfonic acid | Separating agent containing sulfonic acid of the aromatic hydrocarbon |
| Benzene | 19 | |
| Toluene | 19 | Solid. |
| Meta-xylene | 25 | 20. |
| Mesitylene | 15 | Solid. |
| Ethylbenzene | 18 | 20. |
| Cumene | 19 | 24. |
| Amylbenzene | 11 | 16. |
| Tetralin | 26 | 23. |
| Amylnaphthalene | 24 | Solid. |

As heretofore described, the separating agents containing the sulfonic acids of toluene, mesitylene and amylnaphthalene proved unsuitable under the particular conditions of the above tests.

Example XII

A solution comprising 41 parts of sulfuric acid of 79% concentration, 52 parts of benzene sulfonic acid and 7 parts of silver sulfate was used to separate a mixture containing various percentages of benzene in admixture with normal heptane. The results of these tests are listed below:

| Percent by volume of benzene in | | | Percent by volume of the available benzene extracted by equal volume of sep. agent |
|---|---|---|---|
| Charge | Raffinate | Extract | |
| 46 | 36 | 96 | 29 |
| 23 | 14 | 95 | 41 |
| 9 | 4 | 93 | 57 |
| 2 | 1 | | 51 |

Example XIII

A silver sulfate-benzene sulfonic acid-sulfuric acid separating agent containing various percentages of benzene may be treated with normal pentane in order to recover the benzene as is shown in the following table:

| Percent by volume of benzene in the separating agent | Percent of available benzene recovered by extracting with an equal volume of pentane |
|---|---|
| 14.4 | 59 |
| 7.3 | 56 |
| 3.4 | 50 |
| 1.1 | 57 |

I claim as my invention:

1. A process for extracting an aromatic hydrocarbon from a mixture additionally containing other hydrocarbons but relatively free of olefins which comprises contacting said mixture with a separating agent prepared by dissolving a silver compound selected from the group consisting of silver sulfate, silver oxide and silver carbonate in sulfuric acid and then reacting the resulting mixture with a hydrocarbon to produce a final mixture containing the silver compound, sulfuric acid and a sulfonic acid.

2. A process for extracting an aromatic hydrocarbon from a mixture additionally containing other hydrocarbons but relatively free of olefins which comprises contacting said mixture with a separating agent prepared by dissolving silver sulfate in sulfuric acid and then reacting the resulting mixture with an aromatic hydrocarbon to produce a final mixture containing the silver sulfate, sulfuric acid and an aromatic sulfonic acid.

3. A process for extracting an aromatic hydrocarbon from a mixture additionally containing other hydrocarbons but relatively free of olefins which comprises contacting said mixture with a separating agent prepared by dissolving silver sulfate in sulfuric acid and then reacting the resulting solution with benzene to produce a final solution containing the silver sulfate, sulfuric acid and benzene sulfonic acid.

4. A process for extracting an aromatic hydrocarbon from a mixture additionally containing other hydrocarbons but relatively free of olefins which comprises contacting said mixture with a solvent for the aromatic hydrocarbon comprising sulfuric acid having dissolved therein a silver compound selected from the group consisting of silver sulfate, silver oxide and silver carbonate.

5. The process defined in claim 4 further characterized in that said solvent contains a sulfonic acid.

6. The process defined in claim 4 further characterized in that the sulfuric acid concentration is from 65 to 100 percent.

7. A process for extracting an aromatic hydrocarbon from a mixture additionally containing other hydrocarbons but relatively free of olefins which comprises passing said mixture in contact with a solvent for the aromatic hydrocarbon comprising sulfuric acid having dissolved therein a silver compound selected from the group consisting of silver sulfate, silver oxide and silver carbonate, forming during the extraction treatment an aromatic sulfonic acid, separating an extract phase comprising the solvent, the dissolved aromatic hydrocarbon and the aromatic sulfonic acid from the remaining hydrocarbons, separating the aromatic hydrocarbon from the remainder of the extract phase and returning said remainder of the extract phase for reuse in extracting aromatic hydrocarbons from said mixture.

8. A process for extracting an aromatic hydrocarbon from a mixture additionally containing other hydrocarbons but relatively free of olefins which comprises passing said mixture in contact with a solvent for the aromatic hydrocarbon comprising sulfuric acid having dissolved therein a silver compound selected from the group consisting of silver sulfate, silver oxide and silver carbonate and an aromatic sulfonic acid, separating an extract phase comprising the solvent and dissolved aromatic hydrocarbon from the remaining hydrocarbons and recovering the aromatic hydrocarbon from the extract phase.

9. The process defined in claim 8 further characterized in that the aromatic sulfonic acid is formed by reacting sulfuric acid with an aromatic hydrocarbon which is the same as that extracted from said mixture.

10. The process defined in claim 8 further characterized in that said solvent comprises an equilibrium mixture of sulfuric acid, aromatic sulfonic acid and silver compound.

11. The process defined in claim 8 further characterized in that said aromatic sulfonic acid comprises benzene sulfonic acid.

12. The process defined in claim 8 further characterized in that said aromatic sulfonic acid comprises cumene sulfonic acid.

13. A process for separating benzene from a mixture additionally containing other hydrocarbons but relatively free of olefins, which comprises contacting said mixture with a solvent for the benzene comprising an equilibrium mixture of sulfuric acid of from 65 to 100 percent concentration, benzene sulfonic acid and silver sulfate.

14. A process for separating benzene from a mixture additionally containing other hydrocarbons but relatively free of olefins, which comprises contacting said mixture with a solvent for the benzene comprising an equilibrium mixture of sulfuric acid of from 65 to 100 percent concentration, cumene sulfonic acid, and silver sulfate.

15. A process for extracting benzene from a mixture additionally containing other hydrocarbons but relatively free of olefins which comprises contacting said mixture with a benzene solvent prepared by reacting to equilibrium sulfuric acid with an excess of benzene, and saturating the resultant sulfuric acid-benzene sulfonic acid solution with silver sulfate.

BERNARD S. FRIEDMAN.